Feb. 7, 1950 R. H. HOGLUND ET AL 2,496,535
UNITARY CONTROL FOR VELOCITY MODULATION TUBES
Filed Oct. 19, 1945 2 Sheets-Sheet 1
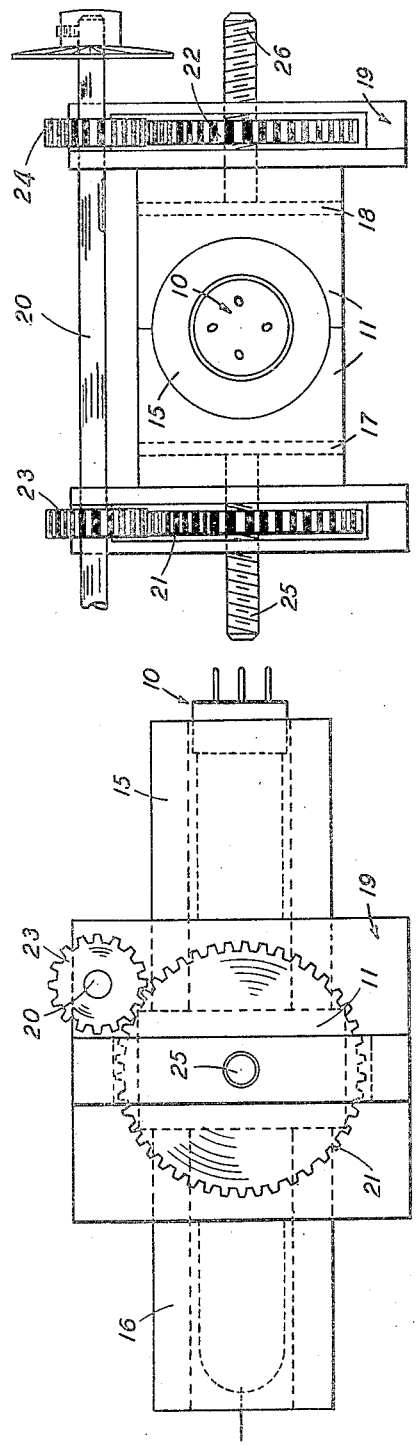
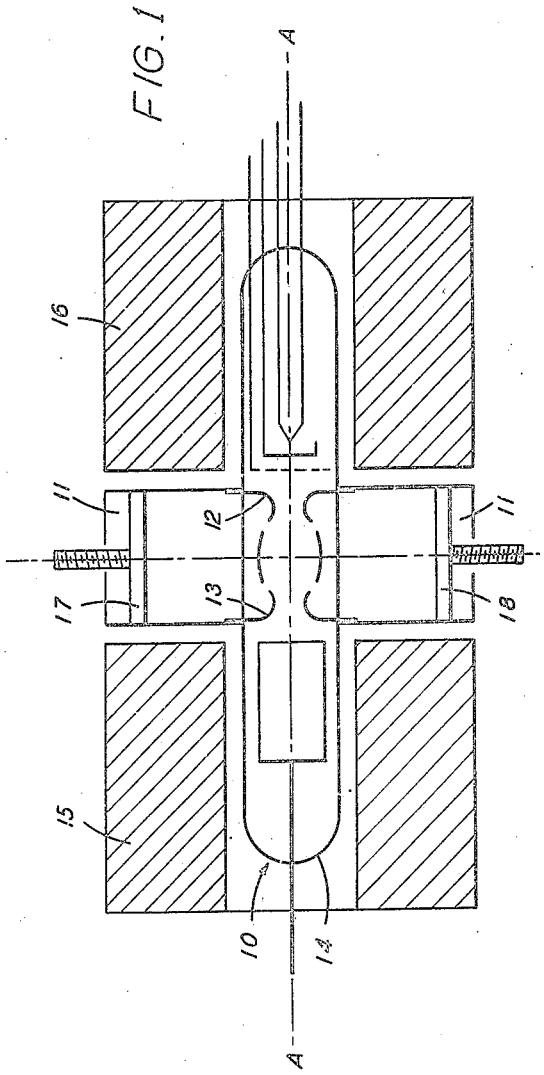
INVENTORS
GEORGE E. HULSTEDE
RALPH H. HOGLUND
BY ANTHONY J. YAKUTIS
William D Hall
ATTORNEY Feb. 7, 1950     R. H. HOGLUND ET AL     2,496,535
UNITARY CONTROL FOR VELOCITY MODULATION TUBES
Filed Oct. 19, 1945     2 Sheets-Sheet 2

INVENTORS
GEORGE E. HULSTEDE
RALPH H. HOGLUND
ANTHONY J. YAKUTIS
BY
ATTORNEY

Patented Feb. 7, 1950

2,496,535

UNITED STATES PATENT OFFICE 2,496,535

UNITARY CONTROL FOR VELOCITY-MODULATION TUBES

Ralph H. Hoglund, George E. Hulstede, and Anthony J. Yakutis, Cambridge, Mass., assignors to the United States of America as represented by the Secretary of War Application October 19, 1945, Serial No. 623,414

2 Claims. (Cl. 179—171)

This invention relates generally to electrical apparatus and more particularly to a single control tuning mechanism for high frequency electronic velocity-modulation vacuum tube amplifiers and oscillators.

Over a limited range the operative frequency of a velocity-modulation tube may be controlled by a plunger varying the size of the associated tuning cavity or cavities. However, beyond this limited range the mode of oscillation changes and it becomes necessary to change other parameters of the tube and its circuit to obtain the desired operating frequency. This requires several interdependent adjustments including that of cavity voltage, accelerator voltage, repeller or collector plate voltage, beam focusing field, and physical deformation of the frequency determining cavity or cavities. Since the adjustments of these parameters are interdependent and are usually quite critical, it is necessary that the individual controls for each of the parameters be coordinated in order to obtain good performance. The difficulty of rapidly making such numerous adjustments manually is obvious. It is also obvious that such adjustments will involve the usual human error and therefore that precise settings can be duplicated only after repeated readjustments.

It is an object of this invention to provide a velocity-modulation tube tuned by a waveguide type of cavity over a wide frequency range in the high frequency end of the radio frequency spectrum by the use of a single control.

In general the tube employed in this invention is a magnetically focused dual orifice, external rectangular waveguide type cavity, velocity- modulation tube. The velocity-modulation tube is at the center of the cavity and since it is designed to operate on what is generally known as the quarter wavelength mode, there is one-half wavelength separation between the tuning plungers adjusting the cavity to one-half waveguide wavelength of the particular frequency of operation. The tube is inserted at right angles to the cavity in such a way that the buncher and catcher orifices of the tube are placed in direct electrical contact with two of the cavity waveguide walls by means of flexible copper discs sealed through glass.

Two tuning plungers are driven symmetrically by right and left hand lead screws by a drive mechanism which is also mechanically connected to vary a series of potentiometers which determine the direct-current cavity potential of the tube. Thus to achieve single dial control of frequency, the direct-current cavity potential, and the position of the tuning plungers are coordinated and adjusted simultaneously.

It is necessary for best operation to use in conjunction with the invention herein disclosed and claimed the automatic beam focusing means which is the subject matter of the application of Ralph H. Hoglund et al., Serial No. 623,416, filed October 19, 1945.

Other objects, features, and advantages of this invention will suggest themselves to those skilled in the art and will become apparent from the following description of the invention taken in connection with the accompanying drawings in which:

Fig. 1 is a diagrammatic presentation of the preferred embodiment of the invention showing the physical arrangement of the electronic tube, magnetic focusing coils, and the tunable waveguide cavities;

Fig. 2 is an elevation showing the mechanical linkage between the tuning plungers of the waveguide cavity;

Fig. 3 is a side view of Fig. 2;

Figures 4, 5:
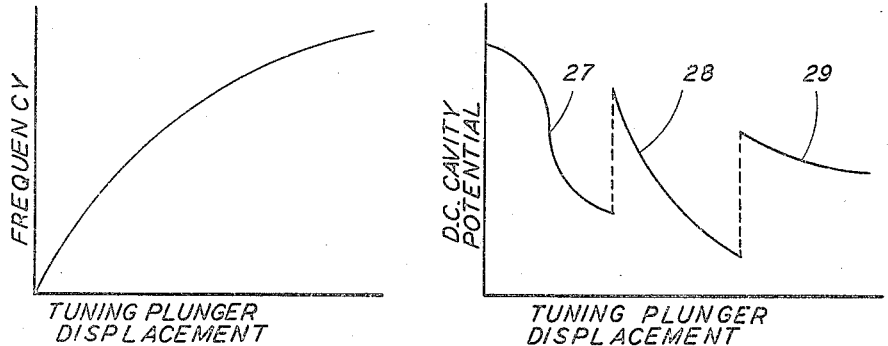
Fig. 4 is a graphic representation of the relationship of tuning plunger displacement and the required direct-current cavity potential.
Fig. 5 is a graphic representation of the relationship between tuning plunger displacement and frequency.

Referring now to Fig. 1, a magnetically focused dual orifice, external cavity, velocity-modulation tube 10 whose general cylindrical construction may be properly appreciated by visualizing it as a figure of revolution about its longitudinal axis A—A, is inserted in the center of and at right angles to rectangular waveguide 11, which may be separated into two symmetrical halves to permit insertion of tube 10, so that corrugated fingers on the rectangular waveguide 11, disposed in a circular shape, make good electrical contact with the outer circumference of buncher grid 12 and catcher grid 13 where these circular grid discs 12 and 13 extend outside of the glass envelope 14 of tube 10. Adjacent to waveguide 11 and inclosing end portions of tube 10, are two annular cylindrical, magnetic focusing coils 15 and 16. Positioned symmetrically within waveguide 11 are two tuning plungers 17 and 18 which are mechanically geared together and are tuned simultaneously so that at all times equal portions of the cavity are on each side of axis A—A of tube 10.

Referring now to Figs. 2 and 3 a framework 19 supports a gear mechanism about the end of waveguide 11 so that any rotation imparted to shaft 20 is transmitted to gears 21 and 22 by gears 23 and 24, respectively. Internal threads about the centers of gears 21 and 22 engage with the movable threaded shafts 25 and 26 of tuning plungers 17 and 18 respectively. Shaft 25 and gear 21 have right hand lead threads and shaft 26 and gear 22 have left hand lead threads, therefore tuning plungers 17 and 18 are moved simultaneously and symmetrically about the center of waveguide 11 by shafts 25 and 26, respectively. Tube 10 surrounded by magnetic focusing coils 15 and 16 is shown at the center of the cavity.

Referring now to Fig. 5, operating frequency versus tuning plunger displacement is shown to be substantially linear. However, as above stated, this is true over only a limited range of frequencies unless adjustments are made in the direct-current potential applied to the cavity. Fig. 4 shows that the direct-current cavity potential required for oscillations to exist at any given frequency or tuning plunger displacement is not a linear function but consists of a series of curves caused by the fact that operation of the tube shifts from mode to mode. In Fig. 4 three distinct modes are shown at 27, 28 and 29.

Figure 6:
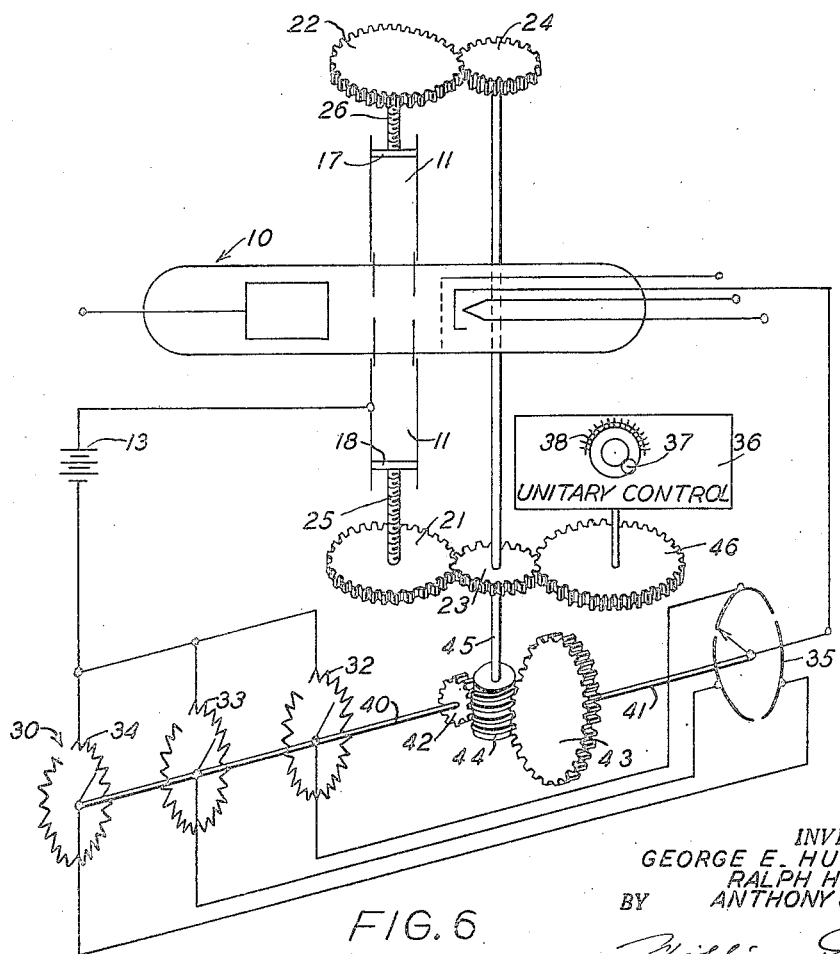
Fig. 6 is a schematic diagram of a tube with the control circuits for the cavity voltage ganged with the cavity plunger adjusting mechanism.

Referring now to Fig. 6, tube 10, external rectangular cavity 11 with its tuning plungers 17 and 18, and the direct-current cavity potential supply and control circuits 30 are shown diagrammatically. Circuit 30, includes a direct current supply source 31, three potentiometers 32, 33 and 34, respectively, and a selector switch 35. The potentiometers are designed to produce voltage changes corresponding to curves 27, 28, and 29, one potentiometer being provided for each mode and switch 35 selects the proper potentiometer for the particular mode desired. Potentiometers 32, 33, and 34 are controlled by the shaft 40. Swith 35 is controlled by the shaft 41. Shafts 40 and 41 are connected by gears 42 and 43 to a common drive screw 44 so that shafts 40 and 41 turn in the ratio 3 to 1.

Screw 44 is connected through the shaft 45 to a gear 23 that engages gearing 46 of the desired ratio from the unitary control box 36. Shaft 45 also connects to gear 24. Gears 23 and 24 engage the gears 21 and 22 that control tuning plungers 17 and 18 as seen also in Figs. 2 and 3.

This gearing is chosen to rotate shaft 41 through one revolution and shaft 40 through 3 revolutions while the tuning plungers 17 and 18 move from one extreme position to the other.

Thus in operation, when knob 37 on unitary control 36 is turned, mechanical linkages operate to tune plungers 17 and 18 properly for the desired frequency and simultaneously linkage 41 selects the potentiometer having the range to give the proper cavity voltage for the particular mode of operation, and linkage 40 varies that potential in accordance with one of the portions of curve 27, 28, or 29 to adjust to the proper cavity potential. In the embodiment shown, when the oscillator is to operate in the low frequency range, the output voltage from potentiometer 32 is used to provide the direct-current cavity potential and that output therefore follows portion 27 of the curve. Similarly, when the oscillator is to operate in the middle frequency range, direct-current cavity potential is supplied by potentiometer 33, whose output follows a different mode which is that of portion 28, of the curve. For operation in the high frequency range, direct-current cavity potential is furnished by potentiometer 34 which follows portion 29 of the curve.

Thus but one manual operation is necessary to accomplish tuning over a much wider range than could be expected by adjustment of cavity plungers alone and the proper and exact relationship of plunger position and cavity voltage is maintained. This makes it possible to place a scale 38 on unitary control 36 which may be calibrated in frequency.

While it is obvious that the required tuning adjustments could be accomplished by several types of mechanical linkage or electronic means or a combination of both, there has been here described what is at present considered to be the preferred embodiment of the invention, and it will be obvious to those skilled in the art that various changes and modifications may be made therein without departing from the scope of the invention.

What is claimed is:

1. In a velocity-modulation electronic tube amplifier tuned by a plunger-operated cavity resonator, a tubular metallic enclosure forming the cavity of said resonator, a direct current potential control circuit connected to said enclosure, said circuit including one of a series of potentiometers, each potentiometer variable to give a range of voltages that produces a distinct mode of resonance, plungers movably disposed in said enclosure, a means for operating said plungers, means for connecting in said circuit a selected one of said potentiometers, and means for varying the potential of said selected potentiometer, all said means being controlled by a common operating means to permit continuous operation through different modes and through the potential variations within a given mode.

2. In a velocity-modulation electronic tube amplifier tuned by a plunger-operated cavity resonator that can permit a plurality of modes of resonance, a metallic enclosure forming said cavity resonator, tuning plungers movable in the cavity resonator, means for controlling the motion of the said tuning plungers, a plurality of means for varying the direct current potential to said enclosure, each adjustable to maintain optimum potential conditions for one mode of resonance, switch means for connecting any one of the means for varying the direct current potential to said enclosure, unitary control means for adjusting the cavity plunger position and simultaneously operating said switch means and varying the direct current potential to provide optimum conditions continuously over a wide band of frequencies through distinct modes of resonance.

RALPH H. HOGLUND.
GEORGE E. HULSTEDE.
ANTHONY J. YAKUTIS.

REFERENCES CITED

The following references are of record in the file of this patent:

UNITED STATES PATENTS

| Number | Name | Date |
| --- | --- | --- |
| 2,185,870 | Smith | Jan. 2, 1940 |